(12) United States Patent
Bailey et al.

(10) Patent No.: US 8,182,176 B2
(45) Date of Patent: May 22, 2012

(54) TENDON-SUPPORTED MEMBRANE PIPE

(75) Inventors: Stephen L. Bailey, Los Gatos, CA (US); Alan K. Miller, Santa Cruz, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 277 days.

(21) Appl. No.: 12/622,725

(22) Filed: Nov. 20, 2009

(65) Prior Publication Data

US 2010/0129160 A1    May 27, 2010

Related U.S. Application Data

(60) Provisional application No. 61/117,041, filed on Nov. 21, 2008.

(51) Int. Cl.
*F16L 1/16* (2006.01)
(52) U.S. Cl. ............ 405/223.1; 405/224; 138/118; 138/177

(58) Field of Classification Search .......... 405/223.1, 405/224, 224.2, 224.3, 224.4; 138/118, 177, 138/178
See application file for complete search history.

(56) References Cited

U.S. PATENT DOCUMENTS

| | | | | |
|---|---|---|---|---|
| 3,162,214 A * | 12/1964 | Bazinet, Jr. | ........ | 138/120 |
| 3,501,173 A * | 3/1970 | Linder et al. | ........ | 285/114 |
| 3,758,083 A | 9/1973 | Palmer | | |
| 4,051,810 A | 10/1977 | Breit | | |
| 4,116,009 A * | 9/1978 | Daubin | ........ | 138/114 |
| 4,212,329 A * | 7/1980 | Horton | ........ | 138/155 |
| 4,231,312 A | 11/1980 | Person | | |
| 4,298,295 A | 11/1981 | Bozzo et al. | | |
| 4,358,225 A | 11/1982 | van der Pot et al. | | |
| 4,497,342 A | 2/1985 | Wenzel et al. | | |
| 4,911,206 A | 3/1990 | Gropp et al. | | |
| 7,735,322 B2 * | 6/2010 | Kuo et al. | ........ | 60/641.7 |
| 7,850,433 B2 * | 12/2010 | Tormaschy et al. | ........ | 417/61 |
| 7,870,732 B2 * | 1/2011 | Kuo | ........ | 60/641.6 |

* cited by examiner

*Primary Examiner* — Frederic L Lagman
(74) *Attorney, Agent, or Firm* — DeMont & Breyer, LLC

(57) ABSTRACT

A pipe comprising a flexible membrane that is disposed over a plurality of spaced-apart tendons is disclosed.

20 Claims, 3 Drawing Sheets

TENDON-SUPPORTED MEMBRANE PIPE

STATEMENT OF RELATED CASES

This case claims priority of U.S. Provisional Patent Application 61/117,041 filed Nov. 21, 2008, which is incorporated by reference herein.

FIELD OF THE INVENTION

The present invention relates to large diameter fluid flow ducts, such as are used in ocean engineering.

BACKGROUND OF THE INVENTION

Large diameter, underwater pipes are required to transport large volumes of fluid under low pressure, for applications such as ocean thermal energy conversion ("OTEC"), algae production for biomass energy, and fresh water transport between regions along coastlines, among other purposes.

These pipes, which extend vertically to significant ocean depths, encounter at least one ocean current. Ocean currents impose drag forces on a structure. Relatively larger structures present a relatively greater amount of area to the current and, as a consequence, experience a relatively greater drag force than a smaller structure from a given current.

The drag forces impose bending loads on the structure, with longer structures experiencing more severe bending stresses. Ocean current drag forces and the bending stresses produced thereby therefore present a significant engineering challenge to the manufacture of deep-water pipes.

Conventional large-diameter pipes are usually constructed as rigid or semi-rigid structures that are self supporting or supported via internal stiffeners. The resulting pipes are not mechanically compliant, and consequently require substantial structure to resist ocean currents or other externally-imposed forces without deflecting or fracturing. Materials in conventional pipes are loaded in both tension and compression, thereby increasing the degree of structural complexity because of the need to resist buckling of the material under compression.

SUMMARY OF THE INVENTION

The present invention provides a pipe that avoids some of the drawbacks and costs of the prior art.

In accordance with the illustrative embodiment of the present invention, a pipe comprises a plurality of tendon-like members that are covered by a water-impenetrable flexible membrane. The tendons, which are arranged lengthwise, are placed in tension, such as by coupling them at both ends to fixtures (e.g., a floating platform at top and a mooring at bottom, etc.). The tension in the tendons enable them to resist membrane forces as well as other external forces, such as ocean currents, that would otherwise tend to collapse the pipe.

Using tendons and a membrane as disclosed herein facilitates the creation of very long joint-free pipes (with the exception, in some embodiments, of seams on the membrane) on site. In fact, the illustrative embodiment of the present invention provides a way to manufacture pipes suitable for OTEC and other deep-water applications wherein the pipe can be about 1000 meters in length or more. The pipes disclosed herein are far less expensive to manufacture than conventional pipes. Furthermore, the transportation of the materials of construction to the installation site is far less expensive and far less risky than for existing very long pipes.

DETAILED DESCRIPTION

Definitions. The term "tendon," as used herein and the appended claims, means a linear structure used to provide lengthwise support (i.e., like a backbone) for an article. The tendon can have a circular, polygonal, or otherwise irregular cross section, and is typically much longer in length than in width or diameter. In some embodiments, a tendon is minimally resilient or not resilient, but, is also not rigid; that is, it is flexible (e.g., a metal cable). In some other embodiments, the tendons are resilient (either due to materials choice and construction). Examples of items that are suitably used as a tendon include, without limitation, rope, cable, filament, tube, cord, pultruded rods (solid), and pultruded cylinders (includes a lumen).

Figure 1:
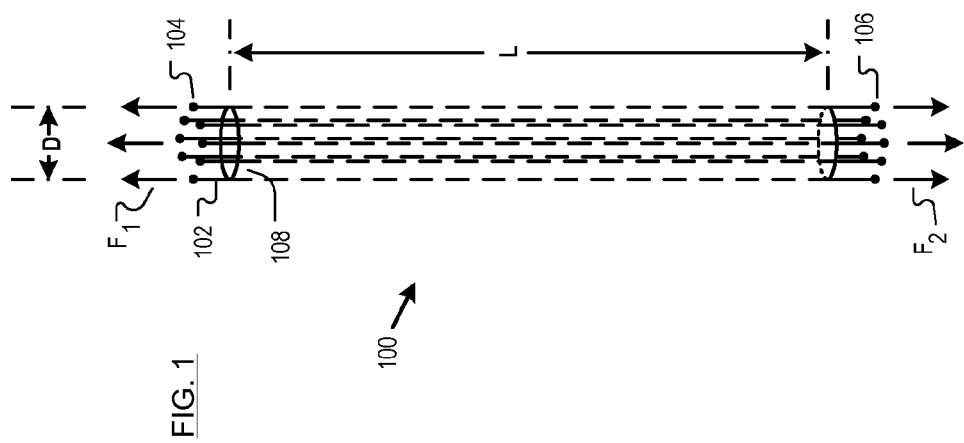
FIG. 1 depicts a tendon-supported membrane pipe in accordance with the illustrative embodiment of the present invention.

FIG. 1 depicts tendon-supported membrane pipe 100 in accordance with the illustrative embodiment of the present invention. Pipe 100 includes a plurality of tendons 102 and overlying membrane 108. In the embodiment of FIG. 1, pipe 100 comprises eight tendons. In other embodiments, more or fewer than eight tendons may suitably be used. Tendons 102 function primarily as structural elements to support membrane 108, which serves as a pipe wall and defines a lumen or passage for the flow of liquid.

Pipe 100, which is shown in a vertical orientation in FIG. 1, has a length L and diameter D. Length L of pipe 100 is defined by the length of membrane 108. In the embodiment that is depicted in FIG. 1, membrane 108 extends substantially the full length of tendons 102, as measured between first end 104 and second end 106 thereof. It will be appreciated that the length of membrane 108 can be any fractional length of tendons 102, as suits a particular application.

In the embodiment depicted in FIG. 1, diameter D of pipe 100 is determined by the placement of tendons 102. In particular, ends 104 of the eight tendons depicted in FIG. 1 collectively circumscribe a circle having a diameter D. And the other end 106 of the eight tendons depicted in FIG. 1 also collectively circumscribe a circle having the same diameter D. As a consequence, pipe 100 has a nominally cylindrical shape. In some other embodiments, the sizes of these two circles are different, such that a conic shape results. In some further embodiments, the ends of each tendon can be arranged to define shapes other than a circle; for example, triangular, square, or other polygonal shapes or even irregular shapes, as might be desired for any particular application, can be defined.

In some embodiments, membrane 108 is elastic and is suitably sized for a pipe having a given diameter D such that the membrane is stretched relatively taut when fitted over tendons 102. To resist membrane forces that would tend to radially constrict pipe 100, tendons 102 are pre-tensioned. In the illustrative embodiment, the tension is imparted by forces acting at end 104 and end 106 of tendons 102. In particular, in the embodiment that is depicted in FIG. 1, force $F_1$ loads first end 104 of the tendons and force $F_2$ loads second end 106 of the tendons. In this embodiment, forces $F_1$ and $F_2$ are acting in opposite directions—that is, 180 degrees apart—with force $F_1$ directed "up" and force $F_2$ directed "down." Arrangements that are consistent with the force scenario depicted in FIG. 1 include, without limitation:

Attaching first (upper) end 104 of each tendon 102 to the top of a support structure (e.g., tower, etc.) and attaching weights to second (lower) end 106 of each tendon, wherein the attached weights are suspended above ground by the tendons. In this scenario, force $F_1$ is provided by the support structure and force $F_2$ is gravity.

Attaching first (upper) end 104 of each tendon 102 to the top of a support structure (e.g., tower, etc.) and attach the second (lower) end 106 of each tendon to a tensioning element (e.g., a ratchet, etc.) that is, in term, secured at a lower elevation (e.g., the ground, a relatively lower position on the tower, etc.). In this scenario, force $F_1$ is provided by the support structure and force $F_2$ is supplied by an operator, motor, etc., that operates the tensioning element.

Attaching first (upper) end 104 of each tendon 102 to a floating structure (e.g., a floating platform, a barge, etc.) and attach, via a tensioning element (e.g., ratchet, etc.) the second (lower) end 106 of each tendon to a mooring that is coupled to the sea bed. In this scenario, force $F_1$ is provided by the buoyancy of the floating structure and force $F_2$ is supplied by an operator, motor, etc., that operates the tensioning element.

Attaching first (upper) end 104 of each tendon 102 to a floating structure (e.g., a floating platform, a barge, etc.) and attach, via a tensioning element (e.g., ratchet, etc.) the second (lower) end 106 of each tendon to a weight that is suspended, via the tendons, above the seabed. In this scenario, force $F_1$ is provided by the buoyancy of the floating structure and force $F_2$ is supplied by gravity.

In conjunction with the present disclosure, those skilled in the art will be able to develop a variety of other arrangements whereby tendons 102 are tensioned to provide pipe 100 in accordance with the present teachings and in a vertical orientation. Furthermore, it is to be understood that the pipe 100 can oriented horizontally or at any angle for use, as long as tendons 102 are placed in tension.

Figure 2:
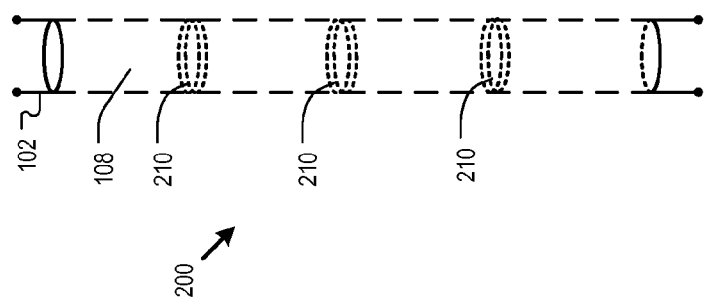
FIG. 2 depicts a tendon-supported membrane pipe that incorporates support members for supporting the tendons along their length against external forces that would otherwise tend to collapse the pipe or reduce its diameter.

FIG. 2 depicts tendon-supported membrane pipe 200 in accordance with a second embodiment of the present invention. In addition to tendons 102 and membrane 108 of pipe 100, pipe 200 includes a plurality of support members 210. (For clarity, only two of the typically larger numbers of tendons 102 that are typically present in pipe 200 are depicted in FIG. 2.)

Not withstanding the tension in tendons 102, in some applications, such as deep water pipes, a relatively long tendon-supported membrane pipe will typically be subjected to forces that tend to decrease the pipe's diameter (i.e., cause an inward deflection of tendons 102) in the absence of auxiliary support. Inward deflection of tendons 102 can be caused, for example, due to ocean currents or the flow of material through the pipe. Thus, although both ends of the pipe might have the same nominal diameter based on tendon placement, tendons 102 can inwardly deflect as a function, among any other parameters, of the unsupported length of the tendons.

In pipe 200, the unsupported length of tendons 102 is altered—shortened—using support members 210. In the embodiment depicted in FIG. 2, the support members are in the form of a ring. In the illustrative embodiment, the support members are disposed radially inward of tendons 102. The support members are advantageously rigid, either due to their material of construction and/or geometry, in the sense that they substantially maintain their circular shape and diameter. It is notable that support members 210 are in compression and, in fact, are the only element of pipe 200 that are not in tension. The support members can suitably be formed from materials such as, without limitation, nonmetallic structural material (e.g., carbon-reinforced composites, etc.) or metallic structural material as long as it is suitable for the particular service. For example, for use in the ocean, suitable metallic structural materials include, without limitation aluminum and stainless steel.

Figure 3:
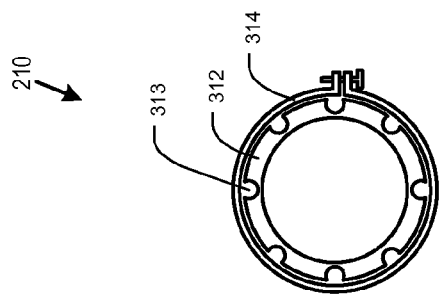
FIG. 3 depicts further detail of the support members of FIG. 2.

FIG. 3 depicts further detail of an embodiment of support members 210. The support member includes ring 312 having tendon-receiving regions 313. Optional clamp 314 fixes or stabilizes the tendons within tendon-receiving regions 313 and prevents ring 312 from sliding along the tendons. In some applications, membrane 108 is stretched sufficiently tight over the tendons to stabilize them in tendon-receiving regions 313 and to prevent ring 312 from sliding along the tendons.

Support members 210 are typically disposed radially inward of tendons 102, as is consistent with their purpose of preventing inward deflection of the tendons. In some embodiments, however, support members 210 are disposed radially outward of the tendons 102. Of course, in such embodiments, the design of the support members must be suitably modified, as is within the capabilities of those skilled in the art.

Figure 4:
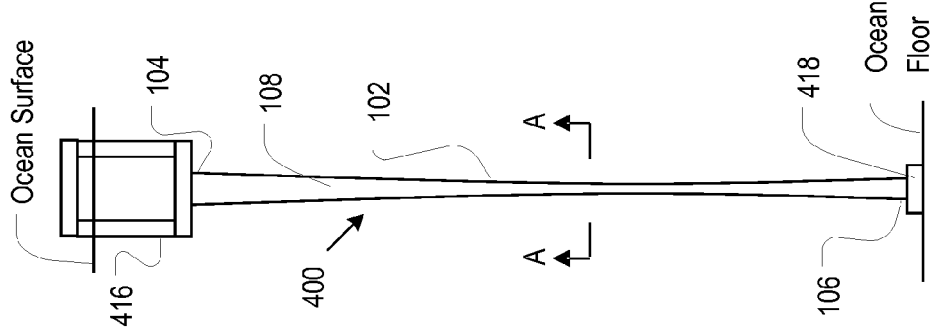
FIG. 4 depicts a first embodiment of article comprising a floating platform and a tendon-supported membrane pipe.

FIG. 4 depicts floating platform 416 and tendon-supported membrane pipe 400 that couples to the platform and extends downward to the ocean floor. Pipe 400 is consistent with pipe 100 depicted in FIG. 1. For some applications, such as OTEC, pipe 400 is in excess of 1000 meters in length and as much or more as 10 meters in diameter.

Tendons 102, only two of which are depicted in FIG. 4 for clarity, are coupled at upper end 104 to platform 416 and at lower end 106 to mooring/inlet 418. As discussed in conjunction with FIG. 1, tendons 102 are vertically pre-tensioned, in this embodiment as a consequence of attachments to platform 416 and mooring 418. An important aspect of pipe 400 is that all materials are in tension only, thereby eliminating the possibility of buckling.

As previously discussed, tendons 102 provide support for membrane 108, which overlays the tendons. In this embodiment, the membrane is water impermeable and flexible, and functions as a pipe wall and defines a lumen for the flow of water. The membrane can be, for example and without limitation, plastic or rubber sheet material such as polyethylene or neoprene in either a fiber-reinforced and/or homogenous condition.

Figure 5:
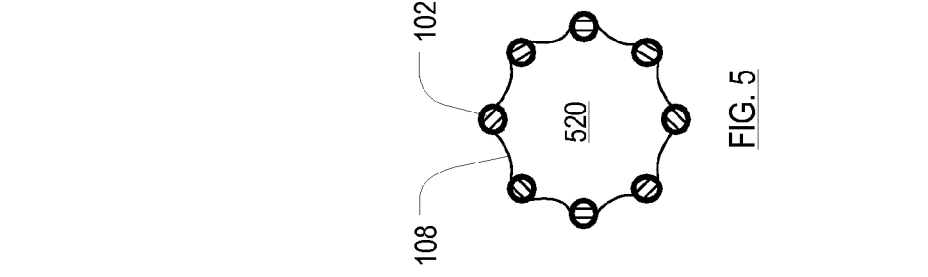
FIG. 5 depicts a sectional view of the tendon-supported membrane pipe of FIG. 3 along line A-A.

Under a pressure differential due to fluid flowing in lumen 520 formed by membrane 108, and due to the thinness and flexibility of the membrane, the membrane forms a catenary shape between tendons 102. This results in the pipe having a stellated or sprocket-like cross section, as depicted in FIG. 5 (which is a sectional view through pipe 400 (FIG. 4) at line A-A. The circumferential length of membrane 108 relative to the circle collectively circumscribed by the ends of tendons 102 controls the tension in membrane 108. The unsupported length of tendons 102 dictates the extent of inward or outward deflection of membrane 108.

Figure 6:
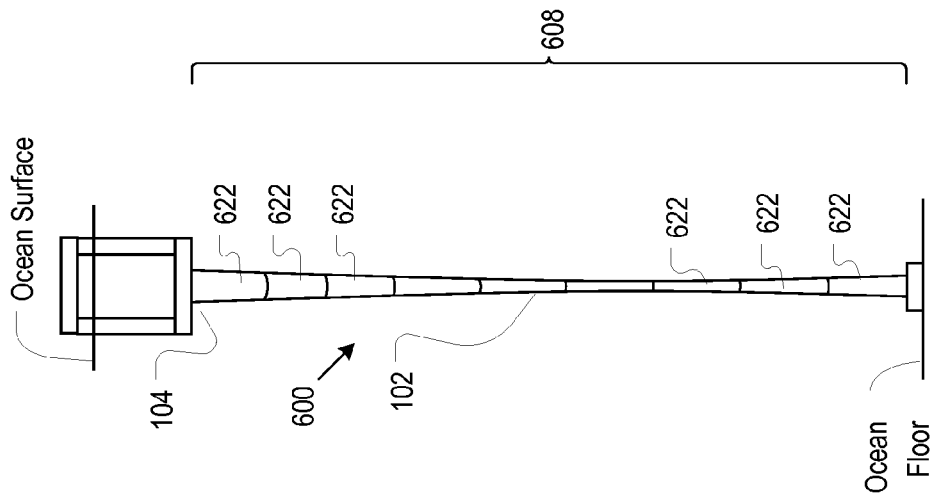
FIG. 6 depicts a tendon-supported membrane pipe with a membrane comprising multiple attached sections.

In pipe 400, membrane 108 comprises a unitary piece of material. FIG. 6 depicts an alternative embodiment wherein membrane 608 comprises a plurality of bands 622 of material that are slipped over tendons 102 near end 104 and then positioned along the length of tendons 102. The individual bands are then attached to one another at opposed edges, such as by heat welding, sewing, or other appropriate joining techniques as a function of the membrane material.

Figure 7:
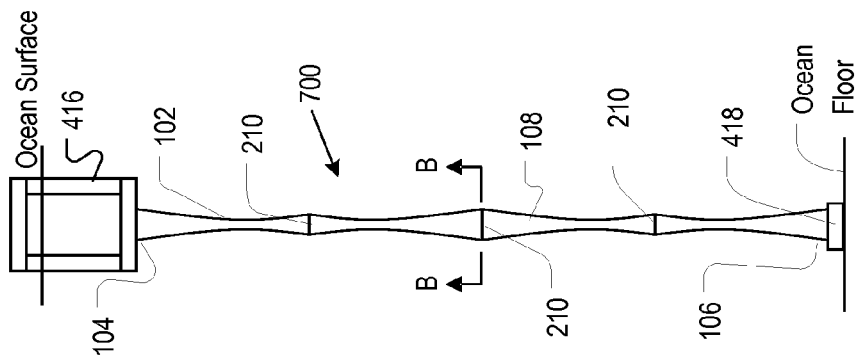
FIG. 7 depicts a second embodiment of an article comprising a floating platform and a tendon-supported membrane pipe, wherein the pipe incorporates support members.

FIG. 7 depicts pipe 700, which is similar to pipe 400 of FIG. 4 except that pipe 700 includes support members 210 (see, e.g., FIGS. 2 and 3). As previously disclosed, the deflection of tendons 102 is a function of, among of the parameters, the unsupported length of the tendons. In pipe 700, the unsupported length of tendons 102 is altered using support members 210. It is notable that the support members are in compression, and are, in fact, the only element of pipe 700 that is not in tension. Support members 210 are advantageously rigid, either due to their material of construction and/or geometry, in the sense that they substantially maintain their circular shape. Suitable materials of construction for the support members have been discussed previously. Either of membranes 108 or 608 can be used to form pipe 700.

Figure 8:
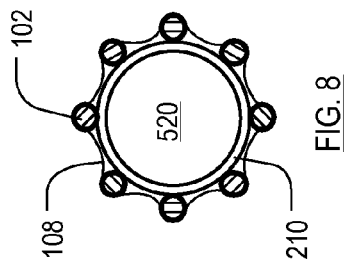
FIG. 8 depicts a sectional view of the tendon-supported membrane pipe of FIG. 6 along line B-B.

FIG. 8 depicts a sectional view of pipe 700 (FIG. 7) at line B-B. Support member 210 (see, e.g., FIG. 3 for additional detail) is shown supporting tendons 102 and membrane 108 against inward deflection.

Figure 9:
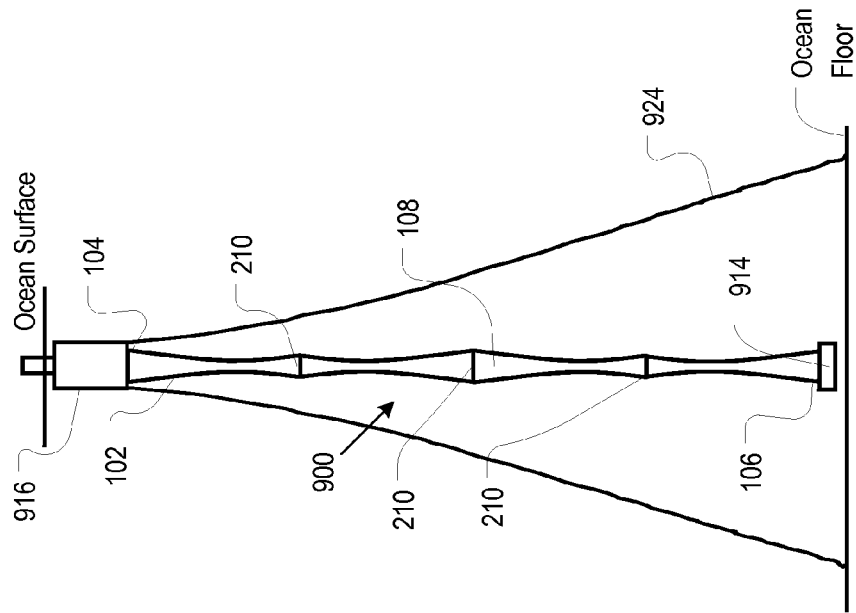
FIG. 9 depicts a third embodiment of an article comprising a floating platform and a tendon-supported membrane pipe, wherein the pipe is not directly moored to the seabed.

FIG. 9 depicts pipe 900, which is not moored to the ocean floor. Rather, in this embodiment, end 106 of pipe 900 couples to inlet fixture 914 that is suspended above the ocean floor. In this embodiment, in addition to their structural function, the tendons suspend inlet fixture 914 above the ocean floor. Platform 916 is stabilized by mooring lines 924, which are coupled to a mooring (not depicted) or otherwise fixed to the ocean floor.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An article comprising a pipe, wherein the pipe comprises:
    a plurality of spaced-apart tendon members, wherein each tendon member has a first end and a second end, and wherein each tendon member is tensioned axially; and
    a flexible membrane, wherein the flexible membrane is disposed over and abutting the tendon members thereby forming a flexible pipe wall, and wherein the respective positions of the tendon members define a cross-sectional shape of the pipe.

2. The article of claim 1 wherein the pipe further comprises support members that resist radially-inward deflection of the tendon members.

3. The article of claim 1 wherein the placement of the tendon members with respect to one another defines the pipe's cross-sectional area.

4. The article of claim 3 wherein the pipe further comprises a plurality of support members that are spaced apart along a length of the pipe and disposed inside of the pipe abutting the membrane, wherein the support members maintain the cross-sectional area of the pipe defined by the placement of the tendon members.

5. The article of claim 1 wherein the second end of at least some of the tendon member couples to a mooring that rests on the ocean floor.

6. The article of claim 1 wherein the second end of each of the tendon members is not coupled to the ocean floor.

7. The article of claim 1 wherein all the tendon members and the flexible membrane remain in tension and are never in compression.

8. The article of claim 1 further comprising a floating platform, wherein the first end of at least some of the tendon members couples to the floating platform.

9. The article of claim 8 wherein the second end of at least some of the tendon members couples to a mooring that rests on the ocean floor.

10. The article of claim 8 further comprising mooring lines that couple the platform to the ocean floor, wherein the second end of each tendon member is not coupled to the ocean floor.

11. An article comprising:
    a floating platform; and
    a pipe, wherein the pipe extends downward from the platform into water, and wherein a first end of the pipe is proximal to the floating platform and a second end of the pipe is under water, and further wherein the pipe comprises:
    (i) a plurality of vertically oriented, spaced-apart tendon members, wherein each tendon member has a first end and a second end, and wherein the first end of each tendon member couples to the floating platform and wherein each tendon member is under tension;
    (ii) a flexible membrane, wherein the flexible membrane is disposed over and abutting the tendon members thereby forming a flexible pipe wall, the tendons defining a shape and cross-sectional area of the pipe; and
    (iii) a plurality of support members that resist inward deflection of the tendon members along the length thereof, wherein the support members are disposed at a plurality of spaced-apart locations along a length of the tendon members.

12. The article of claim 11 wherein the membrane comprises a plurality of bands of material that are attached together.

13. The article of claim 11 wherein the second end of each tendon member couples to a mooring that rests on the ocean floor.

14. The article of claim 11 wherein the second end of each tendon member is not coupled to the ocean floor.

15. The article of claim 11 wherein the tendon members are selected from the group consisting of rope, cable, tubing, pultruded cylinders, and pultruded rods.

16. An article comprising a pipe, wherein the pipe comprises:
    (i) a plurality of spaced-apart tendon members, wherein each tendon member has a first end and a second end, and wherein forces acting on the respective first and second ends of each tendon member are suitable for placing the tendon members under tension;
    (ii) a membrane that is impermeable to a first liquid, wherein the membrane is disposed over and abutting the tendon members thereby forming a pipe wall and defining a lumen for the flow of the first liquid therethrough, wherein support for the membrane against collapse during flow of the first liquid therethrough is provided via the tendon members by virtue of the abutting relationship thereof; and
    (iii) a plurality of support members that resist inward deflection of the tendon members, wherein the support members are disposed at a plurality of spaced-apart locations along a length of the tendon members.

17. The article of claim 16 wherein the membrane has a length that is substantially equal to the length of the tendon members, as measured from the first end to the second end thereof.

18. The article of claim 16 wherein the first end of each tendon member is attached to a floating body and the second end of each tendon member is attached to a submerged body, wherein the floating body and the submerged body impart the forces that place the tendon members under tension.

19. The article of claim 16 wherein the plurality of support members are disposed radially inward of the tendon members.

20. The article of claim 16 wherein a second end of the pipe, which substantially coincides with the second end of the tendon members, is open to admit the first liquid.

* * * * *